April 5, 1949.                B. BRENNER                2,466,202
COMPENSATING LEAD FOR THERMOCOUPLES
Filed June 29, 1945
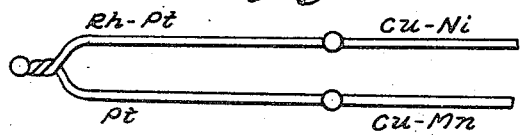
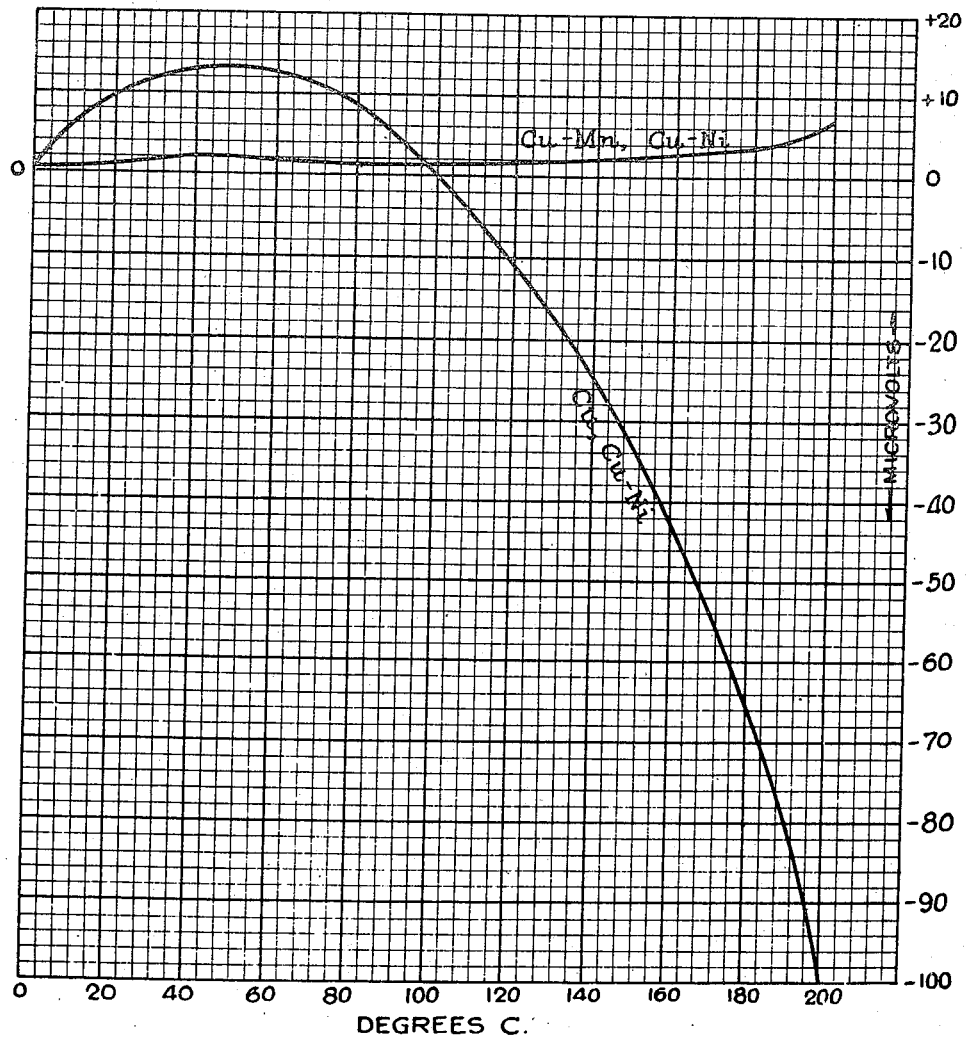
Fig. 2.
INVENTOR
*Bert Brenner*
BY
ATTORNEY Patented Apr. 5, 1949

2,466,202

UNITED STATES PATENT OFFICE 2,466,202

COMPENSATING LEAD FOR THERMOCOUPLES

Bert Brenner, Union, N. J., assignor, by mesne assignments, to Sigmund Cohn Corp., New York, N. Y., a corporation of New York Application June 29, 1945, Serial No. 602,367

9 Claims. (Cl. 136—5)

This invention relates to thermocouples and more particularly to compensating or extension lead wires for platinum, platinum rhodium thermocouples.

Wilfrid S. Peake Patent 1,025,715, May 7, 1912, discloses the use of compensating leads consisting respectively of copper and a copper nickel alloy for connecting the "cold junction" of a platinum, platinum rhodium thermocouple to a temperature recorder or indicator for the purpose of compensating for the effect of changes in the temperature to which the "reference junction" usually the "cold junction" of the thermocouple may be subjected.

As pointed out in William H. Bristol Patent 1,468,456, granted September 18, 1923, it has been found difficult to provide copper nickel alloy wire in lots of uniform composition such that the resultant copper, copper nickel compensating leads compensate for temperature variations within the range of 0° to 100° C. to which the "cold junction" of the thermocouple may be subjected. Patent 1,468,456 discloses the use of compensating leads, one of which consists of substantially pure copper and the other is formed of stranded wire made of an alloy of copper and nickel, the individual strands having different potential values relative to the potential value of platinum. The use of the compensating leads of these patents, in practice, has been found not entirely satisfactory. While it is possible to select a copper nickel alloy which will generate an E. M. F. to give an accurate indication of the temperature to which the "hot junction" of the thermocouple may be subjected when the "cold junction" is at a given temperature, when any substantial deviation from this given temperature is encountered within the range of 0° to 200° C., the recorder may indicate a temperature which is in error by as much as 12° C.

It is an object of this invention to provide compensating leads for a platinum, platinum rhodium thermocouple which throughout the range of 0° to 200° C. in temperature to which the "reference junction" may be subjected accurately compensates for temperature variations. This range of 0° to 200° C. represents the practical range of temperature changes to which the "reference junction" of the thermocouple may be subjected in use.

Other objects and advantages of this invention will be apparent from the following description.

In the accompanying drawing, forming a part of this specification and showing, for purposes of exemplification, a preferred form of this invention, without limiting the claimed invention to such illustrative instance:

Fig. 1 is an elevational view showing a compound thermocouple embodying this invention; and Fig. 2 is a graph showing the deviation from the optimum of prior art compensating leads, and compensating leads embodying this invention when the "reference junction" of compound couples employing such compensating leads are subjected to temperature changes within the range of 0–200° C.

In accordance with this invention the compensating or extension leads are each made up of an alloy of base metals, the two alloys being different and the temperature-E. M. F. relation of the leads throughout the temperature-range of 0° to 200° C. being substantially the same as the temperature-E. M. F. relation of platinum, platinum rhodium throughout this temperature range. Thus with the leads of this invention at the point of measurement an output voltage is produced substantially the same as would be produced by extending the respective platinum, platinum rhodium wires of the thermocouple.

One of the compensating leads may consist of a copper manganese alloy containing for example 85% to 98% copper and 15% to 2% manganese with or without small amounts of metal stabilizing agent or agents, such as lithium, beryllium, aluminum, titanium or other stabilizing agent. The addition of such agents for the purpose of "grain refining," i. e., inhibiting grain growth and degasifying, is well known in the art. The other compensating lead may consist of a copper nickel alloy containing from 99% to 99.95% copper and 1% to .05% nickel, preferably 99.2% to 99.6% copper and .8% to .4% nickel. The compensating leads are particularly designed for use with platinum, platinum rhodium thermocouples, the platinum rhodium portion containing either 10% or 13% rhodium; the compensating leads are connected with the platinum, platinum rhodium thermocouple, as shown in Fig. 1 of the drawing, to form a compound thermocouple, one couple of which consists of the platinum, platinum rhodium thermocouple, and the other of the compensating leads, one of which leads is made up of a copper nickel alloy and the other of a copper manganese alloy, in the proportions hereinabove given. All percentages herein are by weight.

A preferred embodiment of my invention involves a pair of compensating leads, one consisting of 93% to 91% copper and 7% to 9% manganese, and the other consisting of 99.4% to 99.5% copper and .6% to .5% nickel.

With the compensating leads of my invention furnace temperatures have been measured more accurately; in practice the maximum error introduced by the use of the compensating leads embodying my invention is about 1° C., notwithstanding that the "reference junction" of the thermocouple was subjected to different temperatures within the range of 0° to 200° C. This is evident from the data given in Table A below which shows the results of a series of tests in which one end of (a) a couple consisting of a pair of leads made in accordance with the preferred embodiment of this invention and (b) a platinum, platinum rhodium (10%) couple were connected with a microvoltmeter and the other end placed in an oil bath maintained at the temperatures indicated at the table. At each temperature a reading of the E. M. F. generated by each couple was taken and the difference noted. A plus value in the tables indicates the couple under test generates an E. M. F. in excess of that generated by the platinum, platinum rhodium couple. A minus value indicates the couple generates an E. M. F. less than that generated by the platinum, platinum rhodium couple.

Table A

| Temperatures in Degrees Centigrade | Comparative e.m.f. in Microvolts |
| --- | --- |
| 0 | 0 |
| 20 | +.5 |
| 40 | +2 |
| 60 | +1.5 |
| 80 | +1 |
| 100 | +1 |
| 120 | +1.5 |
| 140 | +2 |
| 160 | +2.5 |
| 180 | +3.5 |
| 200 | +7.5 |

Corresponding values for a representative couple one lead of which consists of copper and the other of strands of copper nickel alloy as disclosed in said Patent 1,468,456 as compared with a platinum, platinum rhodium couple are given in Table B below.

Table B

| Temperatures in Degrees Centigrade | Comparative e.m.f. in Microvolts |
| --- | --- |
| 0 | 0 |
| 50 | +13 |
| 100 | 0 |
| 150 | −32 |
| 200 | −102 |

The above is shown graphically in the accompanying drawing in which the abscissa, as indicated on the drawing, are in degrees Centigrade and the ordinates in microvolts. The curve indicated by the legend Cu, Cu Ni shows the difference in microvolts between the E. M. F. generated by a couple consisting of the compensating leads of the prior art hereinabove described and a platinum, platinum rhodium couple. This curve shows the deviation from the optimum which may be encountered in the use of the prior art compensating leads when the "reference junction" of the couple is subjected to temperature changes within the range of 0° to 200° C. This deviation, it will be noted, may be more than 100 microvolts. The curve indicated by the legend CuMn, CuNi shows the difference in microvolts between the E. M. F. generated by a couple consisting of a pair of compensating leads embodying this invention and a platinum, platinum rhodium couple within a range of 0° to 200° C. This curve shows the deviation from the optimum which may be encountered in the use of the compensating leads of this invention when the "reference junction" of the couple is subjected to temperature changes within the range of 0° to 200° C. This deviation, it will be noted, does not exceed about 8 microvolts. Since in the temperature range of 0° to 200° C. under consideration a difference of about 8 microvolts corresponds to 1° C., it will be noted, that the prior art compensating leads may introduce an error of more than 12 degrees centigrade in use, due to changes in temperature conditions to which the "reference junction" may be subjected within the range of 0° to 200° C., whereas the maximum error possible with the compensating leads of this invention is about 1° C. under the same conditions of use.

Since different embodiments of the invention could be made without departing from the scope thereof, it is intended that all matter contained in the above description shall be interpreted as illustrative and not in a limiting sense. For example since a thermocouple composed of the lead wires of this invention have the same temperature E. M. F. relation as that of a platinum, platinum rhodium couple, they may be used in lieu of a portion of the more expensive platinum, platinum rhodium couple; furthermore a couple consisting of the two alloys hereinabove disclosed may be used in lieu of a platinum, platinum rhodium couple for indicating temperatures where the measuring end of the couple is subjected to temperature variations within the range of 0° to 200° C.

What is claimed is:

1. The combination with a platinum, platinum rhodium thermocouple of extension lead wires for said thermocouple which extend to the point of voltage measurement, the lead wires respectively consisting of a copper manganese alloy containing from 7% to 9% manganese the remainder being essentially cooper and a copper nickel alloy containing from .5% to 6% nickel the remainder being essentially copper, for producing at said point of measurement an output voltage substantially the same as would be produced by extending thereto the respective platinum, platinum rhodium wires of said thermocouple.

2. In combination with a platinum, platinum rhodium thermocouple, a pair of extension leads for said thermocouple, one of said leads being connected to said platinum rhodium portion of said thermocouple and consisting of a copper nickel alloy containing from 99% to 99.95% copper and 1% to .05% nickel and the other of said leads being connected to the platinum portion of said thermocouple and consisting of a copper manganese alloy containing from 85% to 98% copper and 15% to 2% manganese.

3. In combination with a platinum, platinum rhodium thermocouple, a pair of extension leads for said thermocouple, one of said leads being connected to said platinum rhodium portion of said thermocouple and consisting of a copper nickel alloy containing from 99.2% to 99.6% copper and .8% to .4% nickel and the other of said leads being connected to the platinum portion of said thermocouple and consisting of a copper manganese alloy containing from 85% to 98% copper and 15% to 2% manganese.

4. In combination with a platinum, platinum rhodium thermocouple, a pair of extension leads for said thermocouple, one of said leads being connected to said platinum rhodium portion of said thermocouple and consisting of 99.4% to 99.5% copper and .6% to .5% nickel and the other of said leads being connected to the platinum portion of said thermocouple and consisting of a copper manganese alloy containing from 93% to 91% copper and 7% to 9% manganese.

5. In combination with a platinum, platinum rhodium thermocouple, extension leads for said thermocouple, one of said leads being connected with the platinum portion of said thermocouple and consisting of a copper manganese alloy containing from 2% to 15% manganese, the remainder of said alloy being essentially copper, and the other of said leads being connected to the platinum rhodium portion of said thermocouple and consisting of a copper nickel alloy containing from .05% to 1% nickel, the remainder being essentially copper.

6. In combination with a platinum, platinum rhodium thermocouple, extension leads for said thermocouple, one of said leads being connected with the platinum portion of said thermocouple and consisting of a copper manganese alloy containing from 2% to 15% manganese, the remainder of said alloy being essentially copper, and the other of said leads being connected to the platinum rhodium portion of said thermocouple and consisting of a copper nickel alloy containing from .4% to .8% nickel, the remainder being essentially copper.

7. In combination with a platinum, platinum rhodium thermocouple, extension leads for said thermocouple, one of said leads being connected with the platinum portion of said thermocouple and consisting of a copper manganese alloy containing from 7% to 9% manganese, the remainder of said alloy being essentially copper, and the other of said leads being connected to the platinum rhodium portion of said thermocouple and consisting of a copper nickel alloy containing from .4% to .8% nickel, the remainder being essentially copper.

8. A thermocouple comprising two alloy wires, one a copper manganese alloy including manganese within the range of 7% to 9% manganese the remainder being essentially copper, and the other alloy wire being a copper nickel alloy containing from .5% to .6% nickel the remainder being essentially copper, said thermocouple for temperatures within the range of 0° to 200° C. having a temperature voltage characteristic closely approximating that of a platinum, platinum rhodium thermocouple.

9. A thermocouple comprising two alloy wires, one a copper manganese alloy including manganese within the range of 2% to 15% manganese the remainder being essentially copper, and the other alloy wire being a copper nickel alloy containing from 1% to .05% nickel the remainder being essentially copper, said thermocouple for temperatures within the range of 0° to 200° C. having a temperature voltage characteristic closely approximating that of a platinum, platinum rhodium thermocouple.

BERT BRENNER.

REFERENCES CITED

The following references are of record in the file of this patent:

UNITED STATES PATENTS

| Number | Name | Date |
| --- | --- | --- |
| 1,468,456 | Bristol | Sept. 18, 1923 |
| 2,098,650 | Stein | Nov. 9, 1937 |
| 2,337,000 | Ray | Dec. 14, 1943 |

OTHER REFERENCES

Roeser, W. F., J. Applied Physics, vol. 11 (1940), pages 395 and 397.

Campbell's List of Alloys, 1930 edition, published by American Society for Testing Materials, page 33.

Engineering Non-Ferrous Metals and Alloys, by Aitchison and Barclay, 1923, published by Henry Frowde and Hodder and Stoughton, London, page 122.

Proceedings of the Institute of Metals Division, AIME, 1928, vol. 78, pages 488–490.

Caswell, A. E., International Critical Tables, vol. 6 (1929), pages 219, 221.

Sosman, R. B., Pyrometry of Solids and Surfaces (1940), page 9.

Rhodes, T. J., Industrial Insts. (1940), pages 114-115.

Behar, M. F., Instruments, vol. 14 (1941), page 232.

Certificate of Correction

April 5, 1949.

Patent No. 2,466,202.

BERT BRENNER

It is hereby certified that errors appear in the printed specification of the above numbered patent requiring correction as follows:

Column 3, line 31, Table A, for "mperatures" read *Temperatures*; column 4, line 1, for "CuMn, CuNi" read *Cu Mn, Cu Ni*; line 48, claim 1, for the word "cooper" read *copper*; line 49, for "6%" read *.6%*;

and that the said Letters Patent should be read with these corrections therein that the same may conform to the record of the case in the Patent Office.

Signed and sealed this 6th day of September, A. D. 1949.

[SEAL]

THOMAS F. MURPHY,
*Assistant Commissioner of Patents.*